(12) United States Patent
Swain

(10) Patent No.: US 6,645,597 B1
(45) Date of Patent: Nov. 11, 2003

(54) CONTAINMENT MAT

(76) Inventor: Michael R. Swain, 30866 E. Knight Dr., Denham Springs, LA (US) 70726

(*) Notice: Subject to any disclaimer, the term of this patent is extended or adjusted under 35 U.S.C. 154(b) by 0 days.

(21) Appl. No.: 10/064,195

(22) Filed: Jun. 20, 2002

(51) Int. Cl.[7] .................................................. B32B 3/02
(52) U.S. Cl. ........................ 428/68; 428/74; 604/378
(58) Field of Search .............................. 206/204, 495; 428/68, 74, 76, 77, 153, 154; 604/378; 5/484, 487, 502

(56) References Cited

U.S. PATENT DOCUMENTS

| | | | | |
|---|---|---|---|---|
| 2,495,636 A | * | 1/1950 | Hoeltzel | ................... 52/404.1 |
| 2,614,273 A | * | 10/1952 | Yancofski | ................... 5/484 |
| 3,709,221 A | * | 1/1973 | Riely | ................... 602/43 |
| 3,856,611 A | * | 12/1974 | Markley | ................... 428/76 |
| 4,216,774 A | * | 8/1980 | Graber | ................... 604/371 |
| 4,479,280 A | | 10/1984 | Yamakazi et al. | ................... 15/217 |
| 4,564,546 A | | 1/1986 | Jones | ................... 428/81 |
| 5,018,235 A | | 5/1991 | Stamatiou et al. | ................... 15/215 |
| 5,142,733 A | | 9/1992 | Mogel et al. | ................... 16/8 |
| 5,252,374 A | * | 10/1993 | Larsonneur | ................... 428/77 |
| 6,443,933 B1 | * | 9/2002 | Suzuki et al. | ................... 604/385.04 |

* cited by examiner

Primary Examiner—David T. Fidei
(74) Attorney, Agent, or Firm—Reginald F. Roberts, Jr.

(57) ABSTRACT

A floor mat for containing household liquid spills. The containment mat includes a folded sheet that contains spilled liquids, and an absorption sheet which absorbs them. The absorption sheet is held in place by the containment sheet entirely by surface tension between the two sheets, and is therefore easily removed and replaced. The containment sheet is sewn in a folded configuration having interlocking corners, thus ensuring that there is no slit in the mat through which the liquids could escape. A fitted cover protects and holds the containment and absorption sheets together as a compact unit.

11 Claims, 5 Drawing Sheets

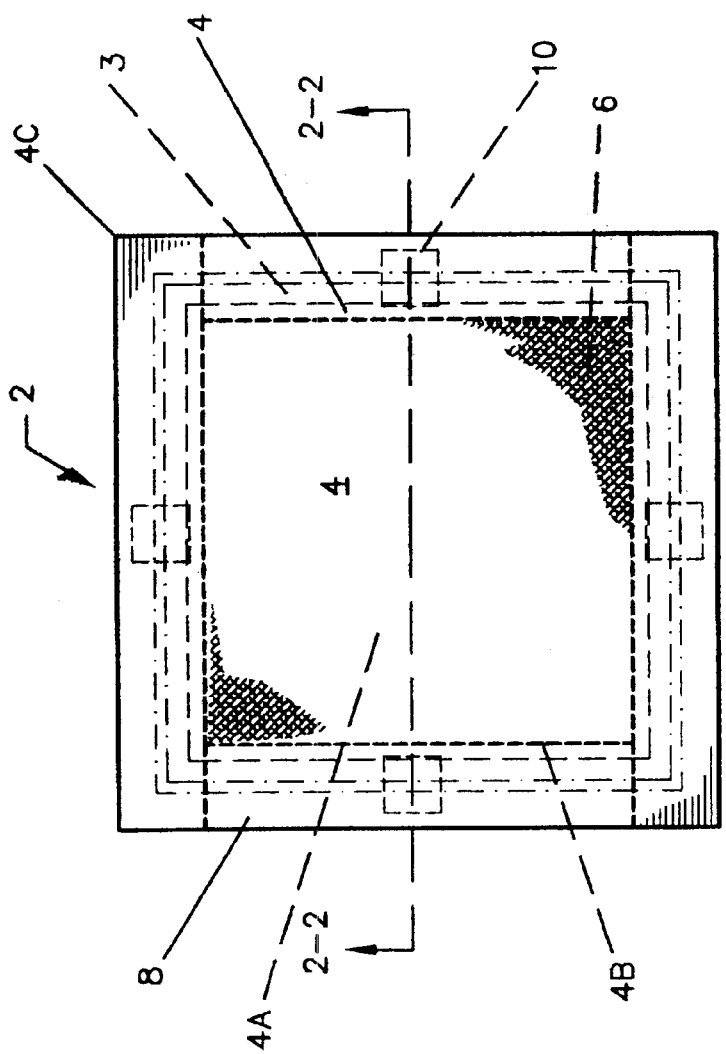
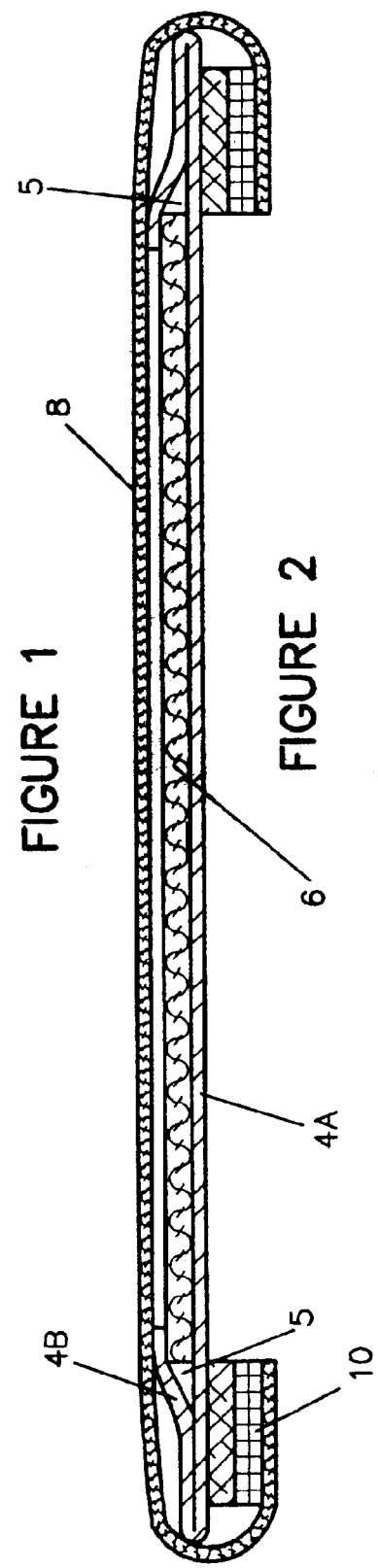

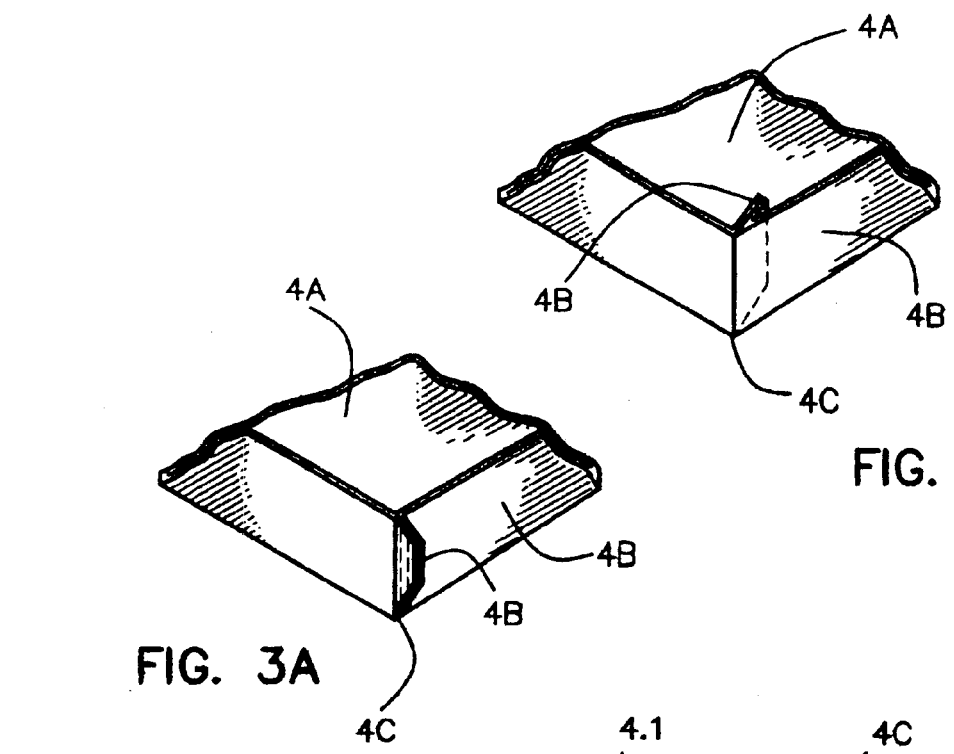
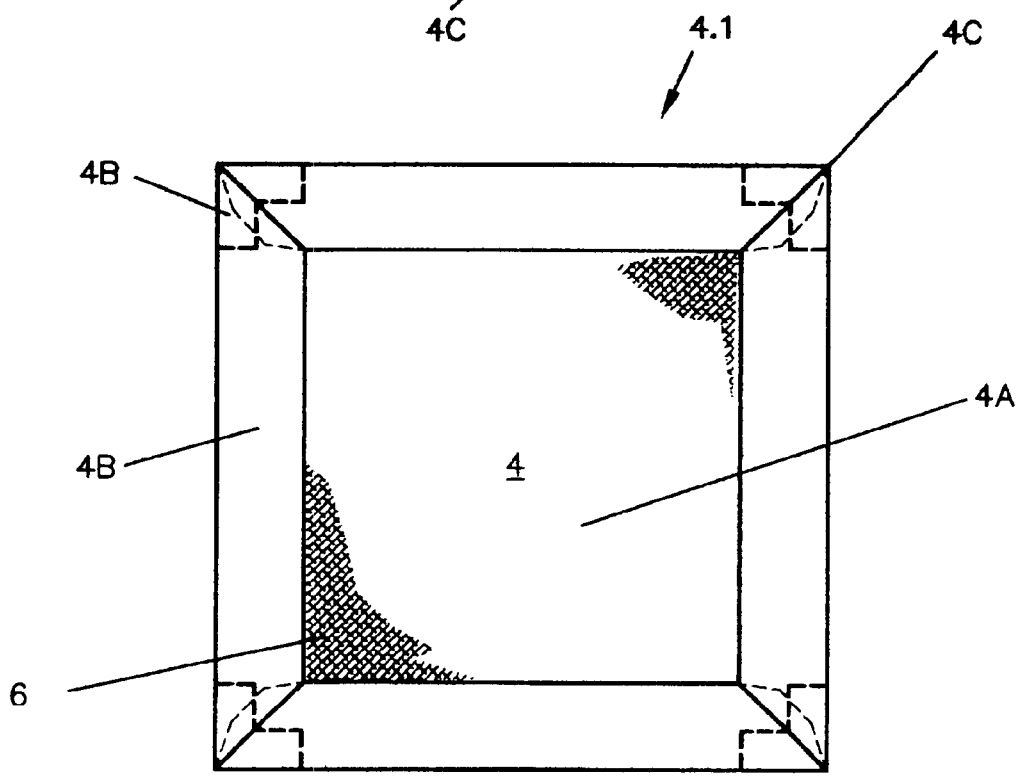
FIGURE 3

CONTAINMENT MAT

BACKGROUND OF INVENTION

1. Field of the Invention

The present invention relates to floor mats. More particularly, the invention relates to mats for containing liquid spills.

1. Scope of the Prior Art

U.S. Pat. No. 5,018,235 to Stamatiou et al. discloses a holder for a disposable floor mat. The holder comprises a base on which the mat rests, at least part of the base having an integral wall so arranged as to form a recess. The recess is dimensioned so as to receive, the mat in a close fit, and the mat is held in place by a lip integral with the wall of the holder and extending above the recess. Guide means on the surface of the holder,provide correct placement of the mat in the holder. Additionally or alternatively, the base of the holder may include holding means comprising a plurality of upwardly extending hooks or spikes.

U.S. Pat. No. 4,564,546 to Jones discloses a releasable mat holder for disposable floor mats. The holder includes a flat base to hold the mat, and a hingedly-connected side flap adapted to fold over on top of an edge of the mat and retain it in position. Means are included to hold the flap against the mat in a closed position to resist movement that would cause wrinkles or bunches in the mat. The base support includes a hand-hole adjacent the edge of the base and located so as to be covered by the flap in the closed position. By means of the hand-hole direct pressure may be applied directly against the flap or by pressing against the mat so as to overcome the holding means and facilitate opening the flap to release the mat.

U.S. Pat. No. 5,142,733 to Mogel et al. discloses a holder for a floor mat comprising a connecting device and a connecting member having complementary connecting devices whereby the connecting member may be connected in a releasable manner to two adjacent mat holders so as to secure the mat holders together.

U.S. Pat. No. 4,479,280 to Yamazaki et al. discloses a mat base plate for use with a shrinkable mat. The mat base plate includes an upstanding rim which extends around a floor of the mat base plate. The rim has a plateau surface at the top thereof, an outer wall, and a slope extending from the plateau to the bottom of the mat-receiving basin, which is formed by the rim and the floor of the mat base plate.

SUMMARY OF INVENTION

In general, the present invention provides a containment mat. The containment mat comprises a containment member and an absorbent member. The containment member is a flexible sheet that is impervious to water, mineral oil, linseed oil, vegetable oils, and other common household liquids. The absorbent member is a flexible sheet that is capable of absorbing water, mineral oil, linseed oil, vegetable oils, and other household liquids.

The containment member comprises first and second portions. The first and central portion is constructed and arranged to be disposed flat on a supporting surface. The second and outer portion is constructed and arranged to be a flexible flap which can be folded down over the first portion to form interlocking corners. The surface area of the central first portion is much larger than the surface area of the outer second portion. The flap is bonded to retain the folded configuration and the interlocking corners.

The absorbent member is freely disposed between the first and second portions of the containment member, arid over the first portion of the containment member, and is held therein and thereto by frictional forces resulting from surface tension between the containment and member and the absorbent member.

BRIEF DESCRIPTION OF DRAWINGS

FIG. 1 is a schematic representation of a containment mat made in accordance with the principles of the present invention.

FIG. 2 is a cross-sectional view of the containment mat shown in FIG. 1 taken along the cutting line 2—2.

FIG. 3 is a plan view of a first embodiment of a portion of the containment mat shown in FIGS. 1 and 2, made in accordance with the principles of the present invention.

FIG. 3A is a schematic representation of a first stage in the preparation of the portion of the containment mat shown in FIG. 3.

FIG. 3B is a schematic representation of a second and final stage in the preparation of the portion of the containment mat shown in FIG. 3.

DETAILED DESCRIPTION

Figure 4:
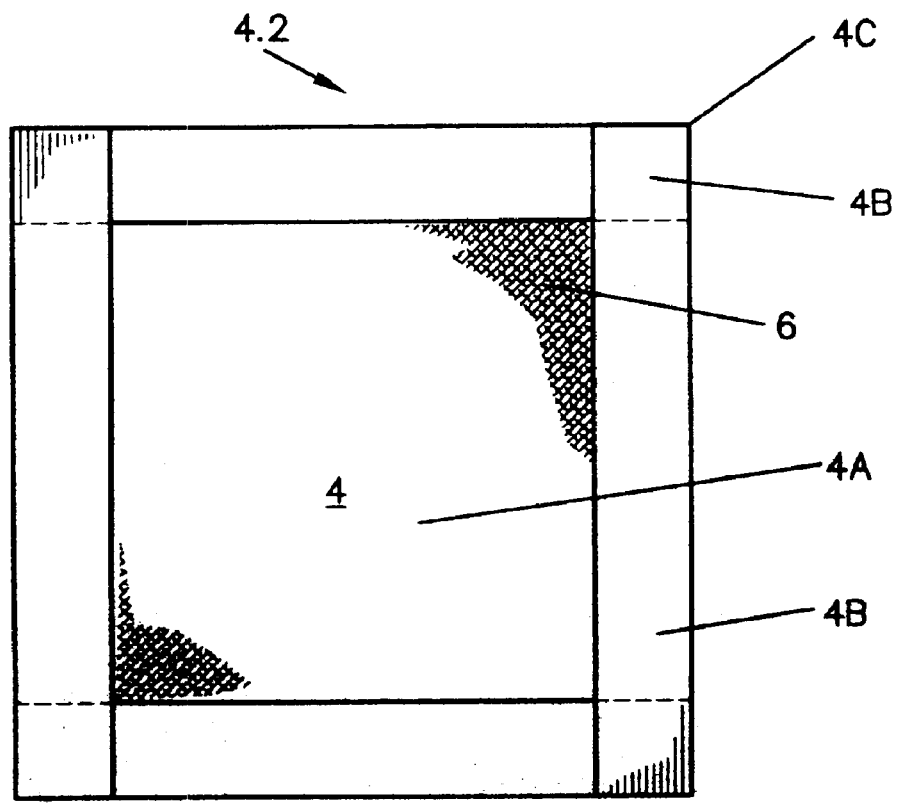
FIG. 4 is a plan view of a second embodiment of a portion of the containment mat shown in FIGS. 1 and 2, made in accordance with the principles of the present invention.

More specifically, reference is made to FIG. 1, in which is shown a containment mat, made in accordance with the principles of the present invention, and generally designated by the numeral 2.

The containment mat 2 comprises a containment member 4, an absorbent member 6, and an outer covering 8. The containment member 4, the absorbent member 6, the outer covering 8, and the entire containment mat 2 are preferably rectangular in shape.

The containment member 4 is a flexible sheet that is impervious to water, moisture, and other household fluids. It is preferably made of a vinyl polymer or resin.

The containment member 4 comprises first and second portions 4a and 4b, respectively. The first and central portion 4a is constructed and arranged to be disposed flat on a supporting surface such as a floor. The second and outer portion 4b is constructed and arranged to be a flexible flap that can be folded down over the first portion 4a. The surface area of the central first portion 4a is much greater than the surface area of the outer second portion 4b of the containment member 4.

The outer portion 4b of the containment member 4 is folded inwardly to form the flexible flap 4b having interlocking corners 4c. The flap 4b is then sewn with stitches 3, heat-sealed, glued, or otherwise bonded to retain the folded configuration. This results in a containment member 4 that is water-tight, yet pliable, and having corners 4c that are flexible yet interlocked to serve as a barrier to prevent moisture from escaping through the corners 4c. Prior-art efforts to accomplish this objective require slits or other relief means in the corners, a fixed channel, or an integral wall to make them pliable. This negates the ability to contain liquids.

The technique of sewing or stitching the containment member 4 has important advantages. Molding or fusing together two layers of material (a) creates rigidity and (b) gives memory to the material that is specifically detrimental to the applications for which the containment member is designed. These methods harden the materials and/or add rigidity, thereby (a) causing discomfort when sat or lain upon, and (b) making the material very difficult to fold and store.

The absorbent member 6 is a flexible sheet having the following properties: (a) Adequate absorption of several types of liquids or staining substances; e.g., water, mineral oil, linseed oil, vegetable oil.

(b) Adaptability in size and thickness with respect to the containment member 4.

(c) Capability of insertion beneath the flap 4b of the containment member 4 with ease, but having enough surface tension so as not to easily slip out from beneath the flap 4b of the containment member 4.

(d) Sufficient flexibility so as not to interfere with the capability to easily fold and store the mat 2.

Materials that satisfy these requirements include cotton, cotton blends, hydrophilic polyesters, and rolled polyester sheets.

The absorbent member 6 (shown partially cut away) is disposed between the first and second portions 4a and 4b of the containment member 4, and over the first portion 4a of the containment member 4, as will be seen most clearly by reference to FIG. 2. The stitching of the containment member 4 can be done either before or after the insertion of the absorbent member 6.

The outer cover 8 is a flexible sheet attached to the containment member 4 using suitable means of attachment. Preferably, the cover 8 is attached to the containment member 4 by means of fitting so that the corners and perimeter of the mat are properly overlapped to envelop and secure the containment member 4 within the cover 8. Additionally or alternatively, hook-and-loop fasteners 10, as shown in FIGS. 1 and 2, may be used to secure or to further secure the cover 8 around the containment member 4 as necessary to maintain proper fit. The positions of the hook-and-loop fasteners may vary, and in some applications may not be employed to secure the cover 8.

The fitted cover 8 holds the containment mat 2 together as a compact unit, and protects the containment member 4 and the absorbent member 6 from dust and other contaminants when not in use. When in use, the outer cover 8 creates an easily removable and cleanable layer than can protect the absorbent member 6 from frequent staining and contamination that occurs in ordinary use. The outer cover 8 may itself be absorbent, but will also be sufficiently porous to permit a liquid spill to migrate through the cover Sand into the absorbent member 6, thus permitting any substance spilled on the assembled containment mat 2 to be absorbed through the cover 8 into the absorbent member 6 and retained within the containment member 4. The removable outer cover 8 creates a unit that is portable, pleasing and changeable in appearance, and useful for a variety of purposes.

The layered structure of the containment mat 2 is best seen in FIG. 2, to which reference is now made. This figure shows a flexible pocket 5 which beneficially permits insertion of various thicknesses of the absorbent member 6.

The size of the mat 2 and appearance of the cover 8 can be modified and adjusted to suit the intended application. Some of the most important applications of the mat 2 are: (a) Snack or eating areas for home or child-care facilities, etc.

(b) Hospital beds for pediatric and adult units.

(c) Protective mats for cars, trucks, sports utility vehicles (SUV's), motorcycles, and automotive vehicles generally.

(d) Storage areas where spills are likely to occur.

(e) Crafts that involve spillable or stainable materials.

(f) Pet areas.

The containment mat 2 differs beneficially and advantageously from prior-art floor mats and mat holders in the following respects: (a) The containment member 4 is preferably sewn or stitched together.

(b) The containment mat 2 is readily foldable.

(c) There is no slit in the containment member 4 through which spilled liquid could escape. The containment member 4 will self-adjust to receive different thicknesses of the absorbent member 6. There is no fixed channel or integral wall, as found in prior-art structures.

(d) The containment member 4 is pliable so as to permit it to be inverted; i.e., turned inside-out, for the purposes of cleaning and sanitizing the areas inside and underneath the folds, then being returned to its normal shape and condition for reassembly.

(e) The absorbent member 6 is freely disposed in the containment member 4, and is held therein and thereto only by frictional forces. The surface tension between the containment member 4 and the absorbent member 6 is sufficient to hold the absorbent member 6 in place.

(f) The containment mat 2 utilizes a fitted cover 8 to protect the containment and absorbent members 4 and 6.

The containment member 4 can be folded in different ways to produce different embodiments of the containment member 4.

Reference is now made to FIG. 3, in which is shown a first embodiment of the containment member 4, generally designated by the numeral 4.1, and generally characterized as having an inverted fold.

The first embodiment 4.1 of the containment member 4 is formed by uniformly folding a selected amount of material from adjoining sides of the outer portion 4b inward to form the flap 4b overlapping the central portion 4a of the containment member 4. Excess material in the corners 4c is gathered evenly together and bonded, forming the flap 4b in each corner 4c. After bonding, the corner flaps 4b are trimmed, leaving enough material to allow the flap 4b to be folded down neatly. This series of operations produces the configuration shown in FIG. 3A. The containment member 4 is then inverted, reversing the flap 4b and internalizing the flap 4b at the corners 4c. The flap 4b is then laid down over the central portion 4a of the containment member 4 and stitched at the corners 4c to produce the configuration shown in FIG. 3B.

Reference is now made to FIG. 4, in which is shown a second embodiment 4.2 of the containment member 4, generally characterized as having an overlapping fold.

Figure 4A:
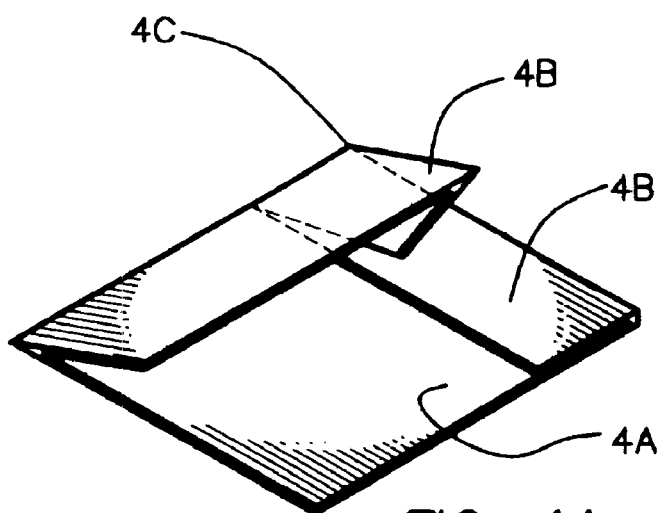
FIG. 4A is a schematic representation of the configuration of the portion of the containment mat shown in FIG. 4

The second embodiment 4.2 of the containment member 4 is formed by uniformly folding a selected amount of material on one side of the outer portion 4b of the containment member 4 down the entire length of that side of the containment member 4 to form the flap 4b. This procedure is repeated on an adjoining side of the containment member 4, forming overlapping folds 4b at a corner 4c. The same procedure is used for the remaining sides of the containment member 4 until all the corners 4c are folded down neatly. The corners 4c are then bonded to secure the folds 4b in place. This series of operations results in the configuration shown in FIG. 4A.

Figure 5:
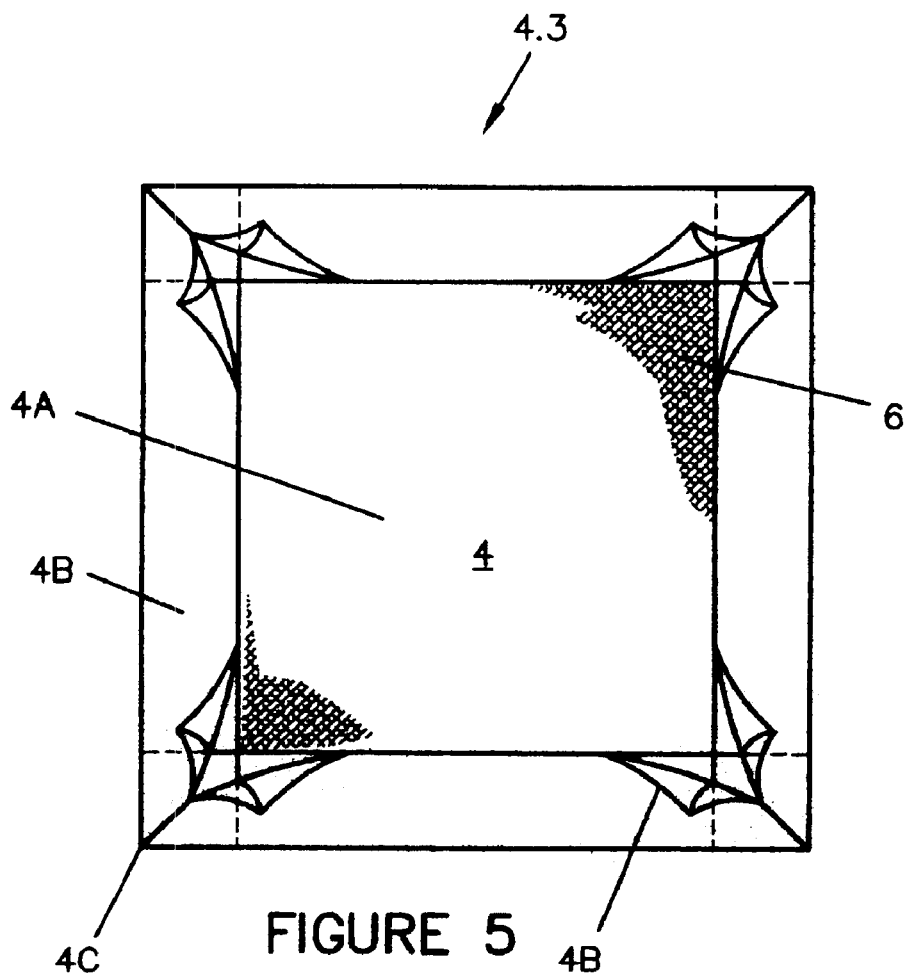
FIG. 5 is a plan view of a third embodiment of a portion of the containment mat shown in FIGS. 1 and 2, made in accordance with the principles of the present invention.

Reference is now made to FIG. 5, in which is shown a third embodiment of the containment member 4, generally designated by the numeral 4.3, and generally characterized as having an internal pleated fold.

Figure 5A:
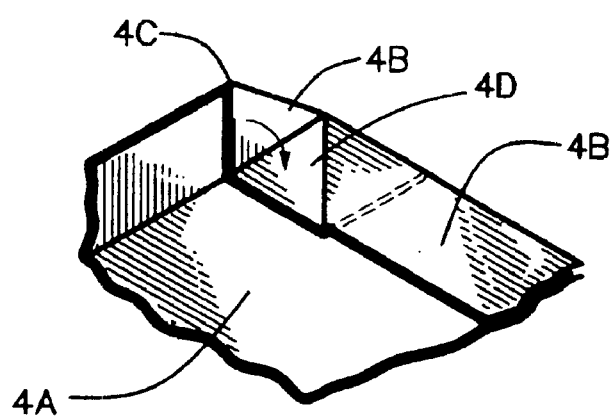
FIGURE 5A is a schematic representation of the configuration of the portion of the containment mat shown in FIG. 5.

The third embodiment 4.3 of the containment member 4 is formed by uniformly folding a selected amount of material from adjoining sides of the outer portion 4b of the containment member 4 inward toward the center of the containment member 4 to form the flap 4b overlapping the central portion 4a of the containment member 4. Excess material that is gathered in the corners 4c is folded so that an internal pleat 4d is formed at each of the corners 4c, with the excess material in each corner 4c tucked and uniformly distributed on the lower surface of the flap 4b. The corners 4c are then bonded to secure the fold 4b in the configuration shown in FIG. 5A.

Figure 6:
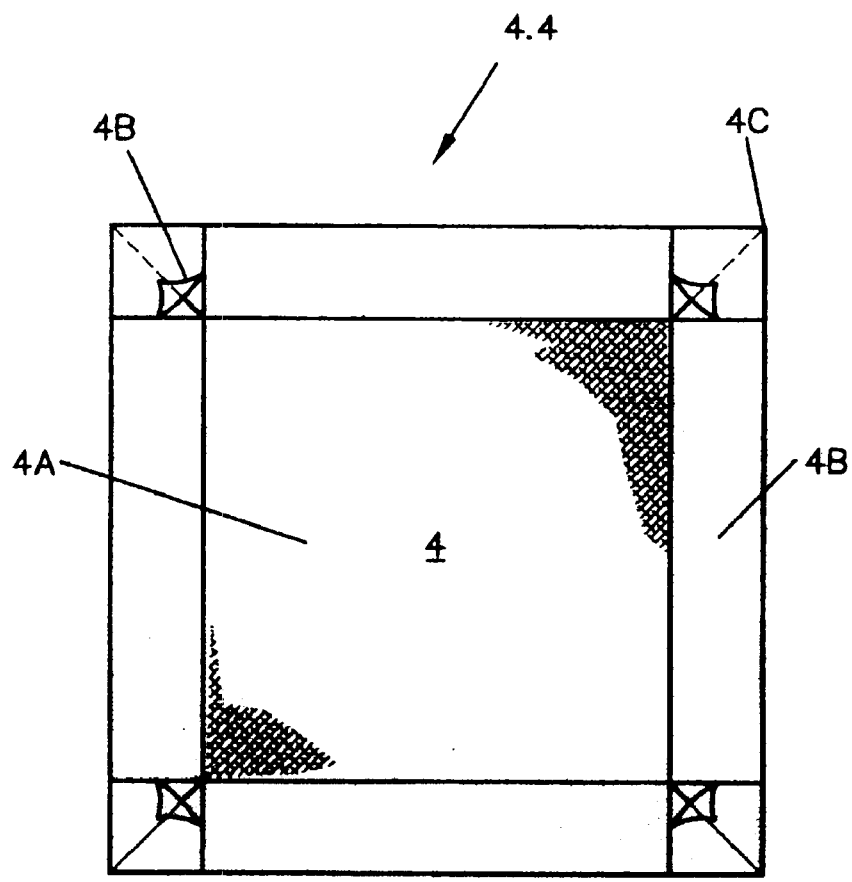
FIG. 6 is a plan view of a fourth embodiment of a portion of the containment mat shown in FIGS. 1 and 2, made in accordance with the principles of the present invention.

Reference is now made to FIG. 6, in which is shown a fourth embodiment of the containment member 4, generally designated by the numeral 4.4, and generally characterized as having an external pleated fold.

Figure 6A:
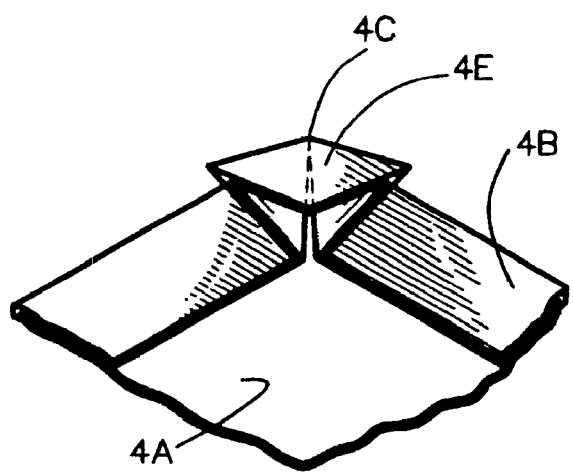
FIG. 6A is a schematic representation of the configuration of the portion of the containment mat shown in FIG. 6.

The fourth embodiment 4.4 of the containment member 4 is formed by folding inward a selected amount of material from adjoining sides of the outer portion 4b of the containment member 4 to form the flap 4b overlapping the central portion 4a of the containment member 4. Excess material gathered in the corners 4c is folded so that an external pleat 4e is formed at each corner 4c, with excess material in the corners 4c raised and uniformly distributed on the upper surface of the flap 4b at the corners 4c. The corners 4c are then bonded to secure the configuration shown in FIG. 6A.

While certain embodiments and details have been described to illustrate the present invention, it will be Apparent to those skilled in the art that many modifications are possible within the spirit and scope of the invention.

I claim:

1. A containment mat, comprising:
   (a) a containment member; and
   (b) an absorbent member;
   the containment member being a flexible sheet that is impervious to water, mineral oil, linseed oil, vegetable oils, and other household liquids; the absorbent member being a flexible sheet capable of absorbing water, mineral oil, linseed oil, vegetable oils, and other household liquids; the containment member comprising first and second portions, the first and central portion being constructed and arranged to be disposed flat on a supporting surface, the second and outer portion being constructed and arranged to be a flexible flap which can be folded down over the first portion to form interlocking corners, thereby forming a flexible pocket which will accommodate insertion therein of an absorbent member of various thicknesses, the surface area of the central first portion being much greater than the surface area of the outer second portion, the flap being bonded to retain the folded configuration and interlocking corners; the absorbent member being freely disposed between the first and second portions of the containment member, and over the first portion of the containment member, and held therein and thereto only by frictional forces resulting from surface tension between the containment member and the absorbent member.

2. The containment mat of claim 1, further comprising:
   (c) an outer cover comprising a flexible sheet constructed and arranged to fit over the containment member and the absorbent member, to hold the mat together as a compact unit, and to protect the containment member and the absorbent member from dust and other contaminants when the mat is not in use; and
   (d) means for attaching the outer cover to the containment member.

3. The containment mat of claim 1, wherein the flap is stitched to retain the folded configuration and interlocking corners.

4. The containment mat of claim 1, wherein the containment member is characterized as having an inverted fold.

5. The containment member of claim 1, wherein the containment member is characterized as having an overlapping fold.

6. The containment mat of claim 1, wherein the containment member is characterized as having an internal pleated fold.

7. The containment mat of claim 1, wherein the containment member is characterized as having an external pleated fold.

8. The containment mat of claim 1, wherein the containment member is rectangular and is formed by uniformly folding a selected amount of material from adjoining sides of the outer portion inwardly to form the flap overlapping the central portion of the containment member; gathering evenly together and bonding excess material in the corners to form the flap in each corner; trimming the corner flaps, leaving enough material to allow the flap to be folded down; inverting the containment member to reverse the flap and internalize the flap at the corners; laying down the flap over the central portion of the containment member; and bonding the flap at the corners to produce a containment member having a plurality of inverted folds.

9. The containment mat of claim 1, wherein the containment member is rectangular and is formed by folding a selected amount of material from the outer portion on one side of the containment member down its entire length; folding a selected amount of material from the outer portion of an adjoining side down its entire length to form overlapping folds at a corner of the containment member; folding a selected amount of material from the outer portion of one of the other remaining sides down its entire length; folding a selected amount of material from the outer portion of the remaining side down its entire length to form overlapping folds at the other remaining corners of the containment member; and bonding the flap at each corner of the containment member to produce a containment member having a plurality of overlapping folds.

10. The containment mat of claim 1, wherein the containment member is rectangular and is formed by folding a selected amount of material from adjoining sides of the outer portion of the containment member inwardly toward the center of the containment member to form a flap overlapping the central portion of the containment member; folding excess material that has gathered at the corners of the containment member to form an internal pleat at each corner, with excess material in each corner tucked and disposed on the lower surface of the flap; and bonding the corners to secure the fold and produce a containment member having a plurality of internal pleated folds.

11. The containment mat of claim 1, wherein the containment member is rectangular and is formed by folding inwardly a selected amount of material from adjoining sides of the outer portion of the containment member to form the flap overlapping the central portion of the containment member; folding excess material gathered in the corners so that an external pleat is formed at each corner, with excess material in the corners raised and disposed on the upper surface of the flap at the corners; and bonding the corners to produce a containment member having a plurality of external pleated folds.

* * * * *